Feb. 9, 1943.  R. T. BLAKELY  2,310,389
TIME RECORDER
Filed March 13, 1940  6 Sheets-Sheet 1
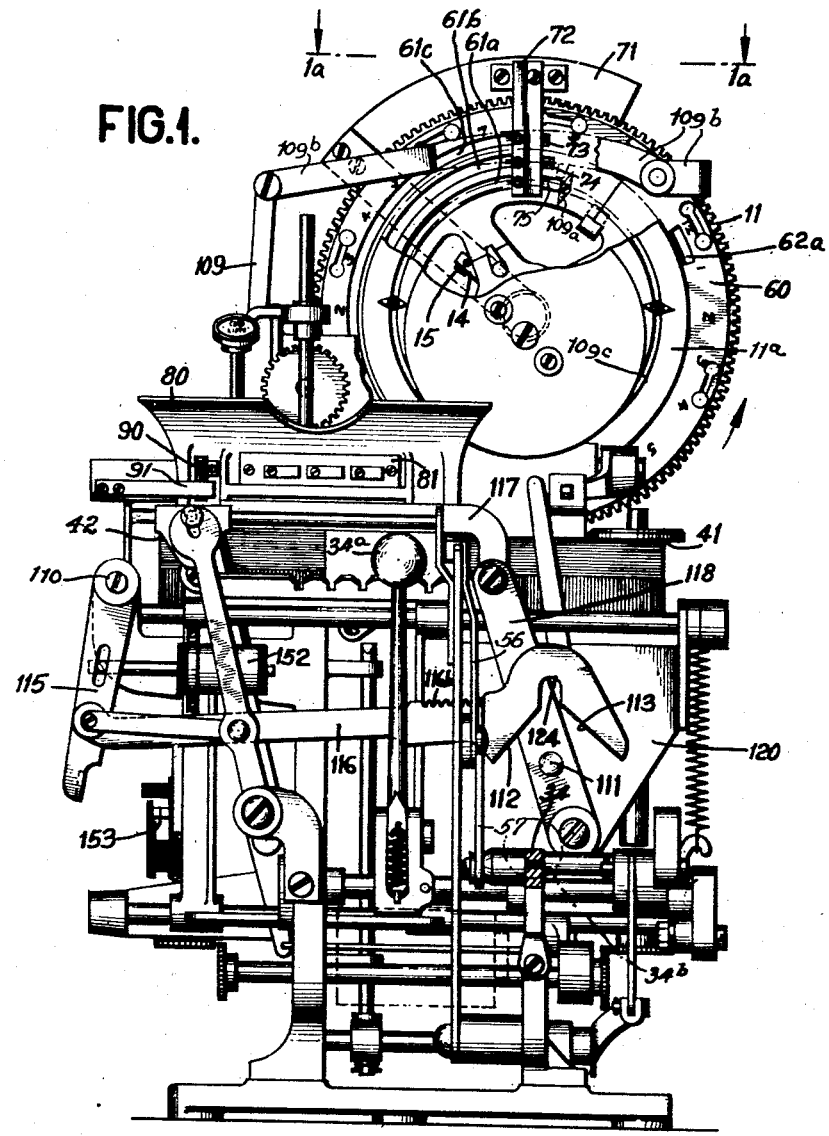

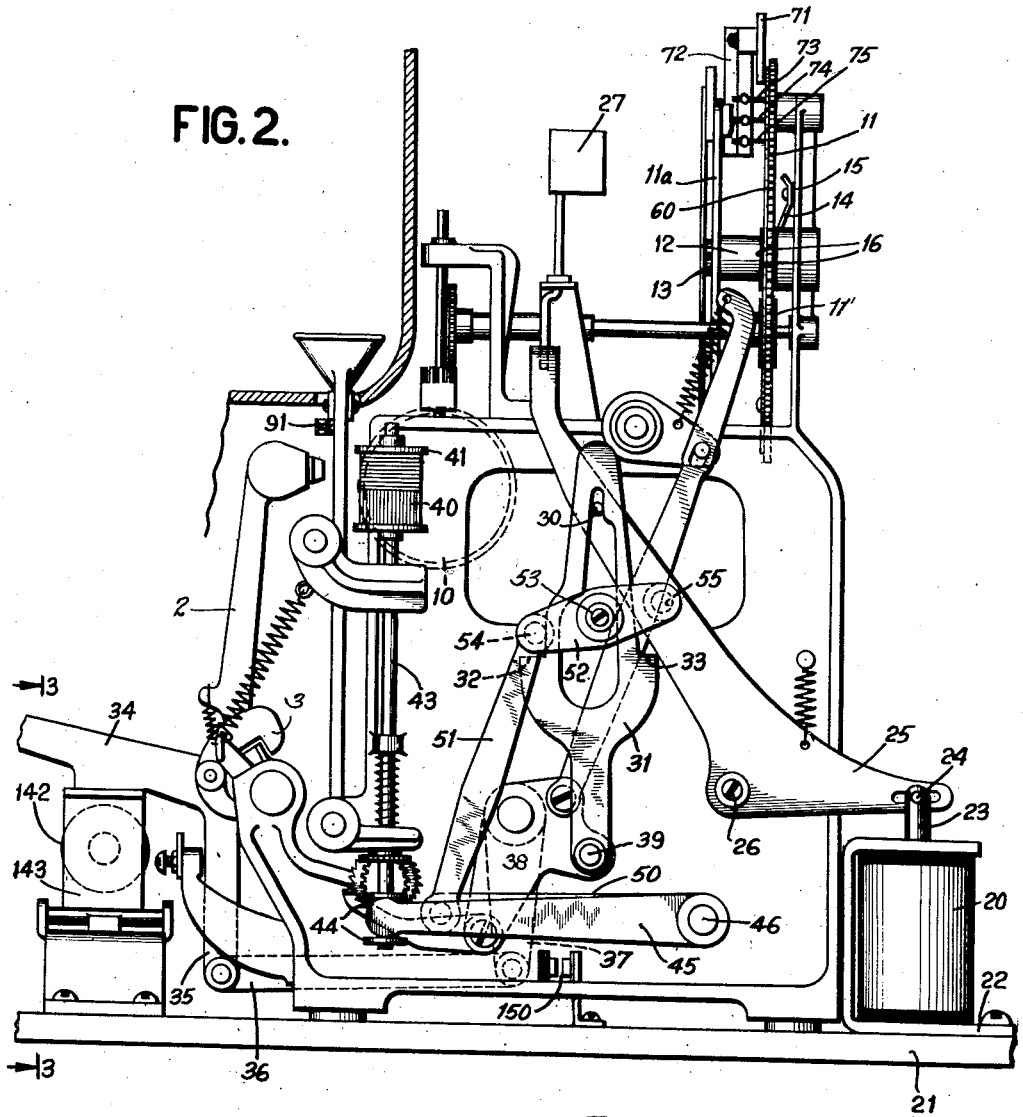

Feb. 9, 1943.   R. T. BLAKELY   2,310,389
TIME RECORDER
Filed March 13, 1940   6 Sheets-Sheet 3

INVENTOR.
Robert T. Blakely
BY
ATTORNEY.

Feb. 9, 1943.　　　R. T. BLAKELY　　　2,310,389
TIME RECORDER
Filed March 13, 1940　　　6 Sheets-Sheet 4
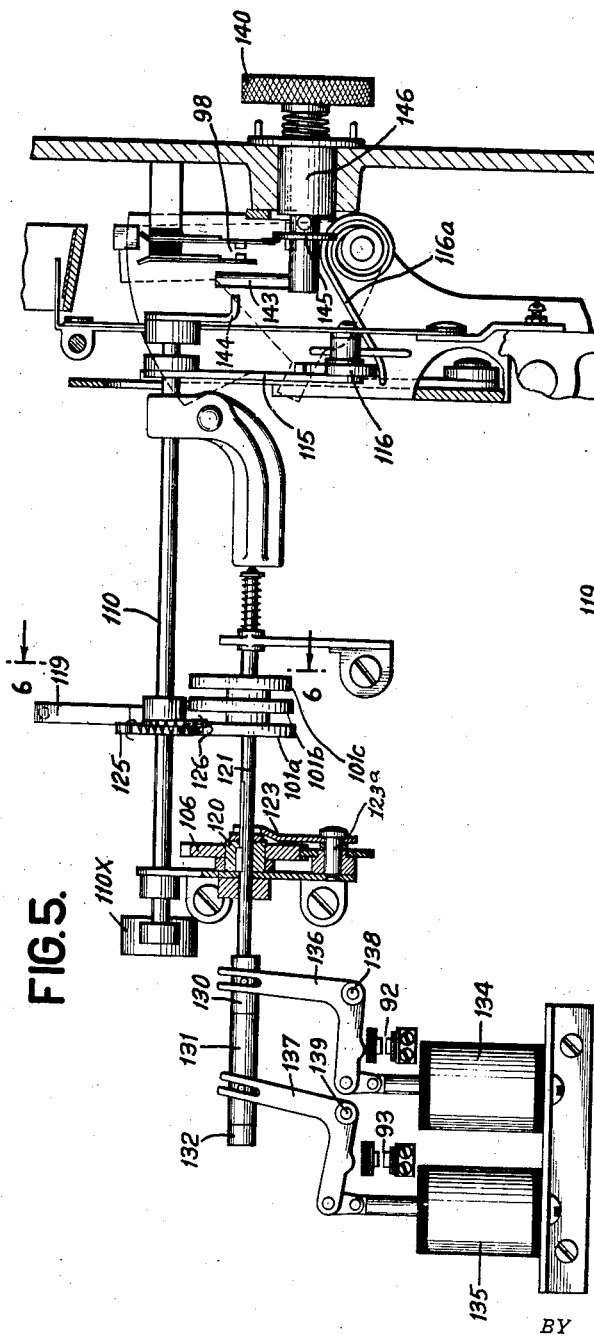
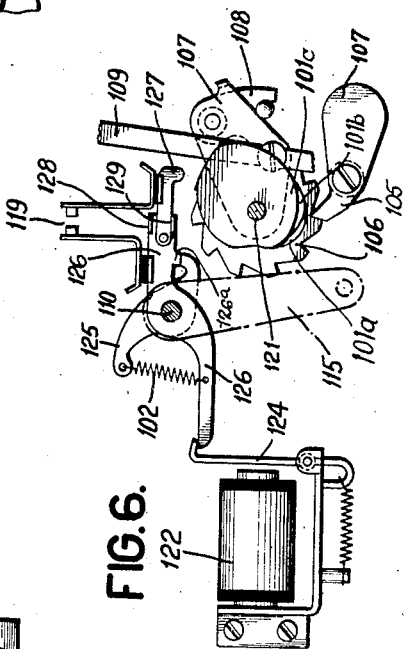
INVENTOR
Robert T. Blakely
BY
ATTORNEY.

Feb. 9, 1943.  R. T. BLAKELY  2,310,389
TIME RECORDER
Filed March 13, 1940  6 Sheets-Sheet 5

INVENTOR.
Robert T. Blakely
BY
W. M. Wilson
ATTORNEY.

Feb. 9, 1943.    R. T. BLAKELY    2,310,389
TIME RECORDER
Filed March 13, 1940    6 Sheets-Sheet 6
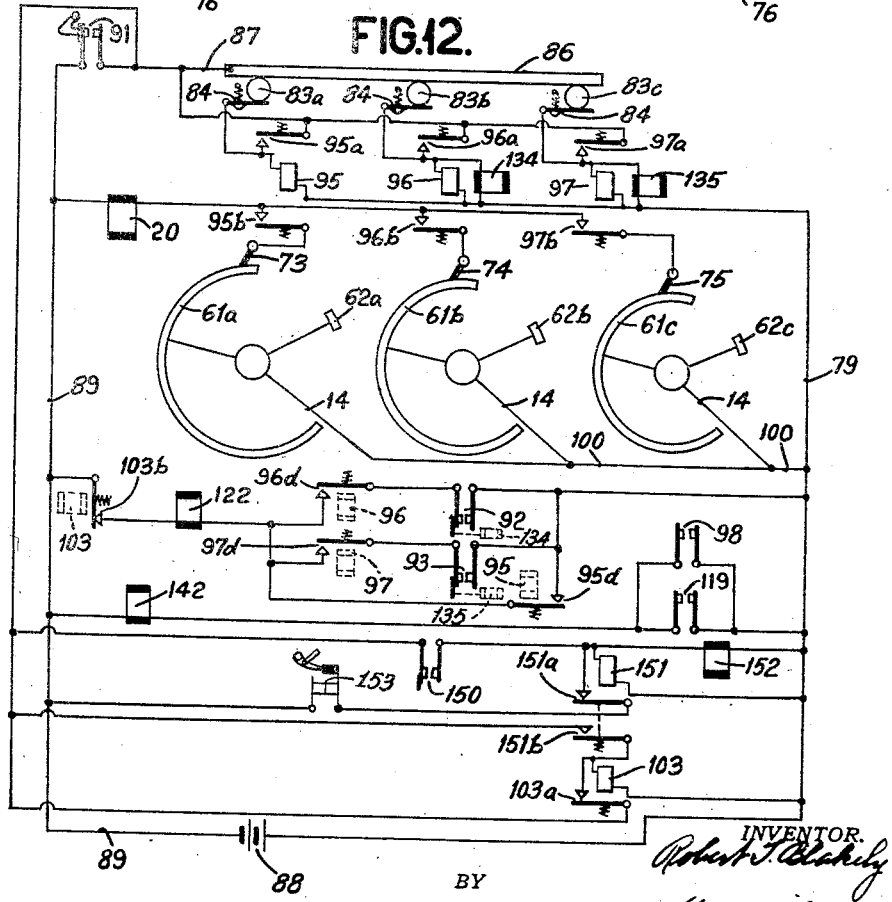

Patented Feb. 9, 1943

2,310,389

UNITED STATES PATENT OFFICE 2,310,389

TIME RECORDER

Robert T. Blakely, Ridgewood, N. J., assignor to International Business Machines Corporation, New York, N. Y., a corporation of New York Application March 13, 1940, Serial No. 323,651

19 Claims. (Cl. 234—43)

This invention relates to time recording mechanisms and, more particularly, to card time recorders wherein time registrations are made on cards individually assigned to each employee and inserted by him into proper position to receive such registrations in accordance with a predetermined schedule of time periods.

The present commercial time recording devices are adapted to imprint upon individual records the time limit of the working hours used by a corresponding employee throughout a given period. This period may be a day, week, fortnight, or in fact any preassigned number of days. The records are customarily divided into individual rows or columns assigned to each day during the period. Time registrations made by the various employees during the day are controlled from a so called program device. Such program device determines the printing position in any particular row or column. It is also customary to assign regular registration periods and to cause time registrations made during the regular assigned periods to be of one color and those made during irregular periods to be of a distinctively different color. From the foregoing it may be seen that if an employer has two or more employee groups with different daily schedules of working hours he will require, when using the known types of recorders, an individual machine for each such group. Accordingly, it is therefore, the general object of the instant invention to provide a single time recorder capable of handling the time records of a plurality of groups of employees, each group having a different daily schedule.

A further object of the instant invention resides in the provision of an improved time recorder including means for establishing a plurality of different schedules of time periods and novel means controlled by the inserted time card for determining which of the schedules is to control recording on the card.

A more specific object of the invention is to provide a novel program device having a predetermined setting and mechanism cooperating therewith for obtaining the equivalent of a plurality of settings by selective operation thereof under control of the card.

Another object is to provide card controlled means for positioning the card relative to the recording mechanism for recording purposes in accordance with a schedule selected by the card.

Still another object is to provide a unique program determining means governed by the location of a designating slot in the time card.

According to the present invention, provision is made for a plurality of program devices in a single recorder and control means for connecting any desired one of the program devices with the time printing mechanism. The program device for any employee is selected by an identifying characteristic on his card for operation at the time his registration is being made.

The advantages of the proposed program selecting device over the prior art may be best revealed by citing a specific use of this device. Assume, for example, a situation wherein say three departments of a manufacturing concern are using the same time recorder and have differently scheduled working hours. Department A is to go to luncheon from 12:00 to 12:45, department B from 12:15 to 1:00, and department C from 12:30 to 1:15. It is desired that for all persons going out and coming back within the specified limit of three-quarters of an hour that the recorder shall print blue in the proper column to signify in-program (or regular interval) registrations. Columns of the cards are provided with the customary headings including "noon out" and "noon in," etc.

For distinguishing purposes, each card has a slot cut in it to represent the department to which it is related, the slots for the different departments being in different locations on the card. A sensing means is provided to sense the slot as the card is inserted into printing position. A card from department A is thereby caused to receive blue registrations from 12:00 to 12:45, in the "noon out" column from 12:00 to 12:30 and in the "noon in" column from 12:31 to 12:45, the card being arranged to be shifted to the "noon in" column at 12:31. Should an employee from department A make his recording before 12:00 or after 12:45 it will appear in red to indicate an out-of-program registration.

A card from department B receives blue registrations in the "noon out" column from 12:15 to 12:45 and in the "noon in" column from 12:46 to 1:00. Registrations effected before 12:15 or after 1:00 are made to appear in red.

Similarly, a card from department C causes printing of blue in the "noon out" column from 12:30 to 1:00 and in the "noon in" column from 1:01 to 1:15. Other times appear in red.

It will be appreciated from the above example that a plurality of different groups of employees, each group under a different luncheon schedule may make the required time records of their arrival and departure in proper columns of their individual cards and in the proper color depending on whether or not the registration is within a regular interval. All of the foregoing may be effected with the use of but one time recorder provided with the program selecting means proposed by the present invention.

It is also obvious that this program control may be employed for other predetermined time periods such "morning in" time and "evening out" time, for example. Furthermore, it will be understood that the controlling designation on the card may effect the change either mechanically or electrically. In the present invention an electrical sensing means is used, but it is evident that a substitution of mechanical sensing means for electrical means may be made by one skilled in the art without departing from the spirit of the invention.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 shows the apparatus in front elevation without the clock and the usual enclosing case.

Fig. 1a is a top view of the brush holder and program wheel.

Fig. 2 is a right side view of the apparatus shown in Fig. 1 and discloses in detail the electrically controlled ribbon shifting mechanism.

Fig. 3 is a detail view showing the hammer trip arm latching mechanism.

Fig. 5 is a left side view, partly in section, of some of the apparatus shown in Fig. 1, including a ratchet drive mechanism.

Fig. 6 is a detail view taken substantially along the line 6—6 of Fig. 5 showing the mechanism involved in shifting the card receiver.

Figs. 10 and 11 show examples of special time cards relating to different departments.

Fig. 12 is a circuit diagram of the machine.

Figure 4:
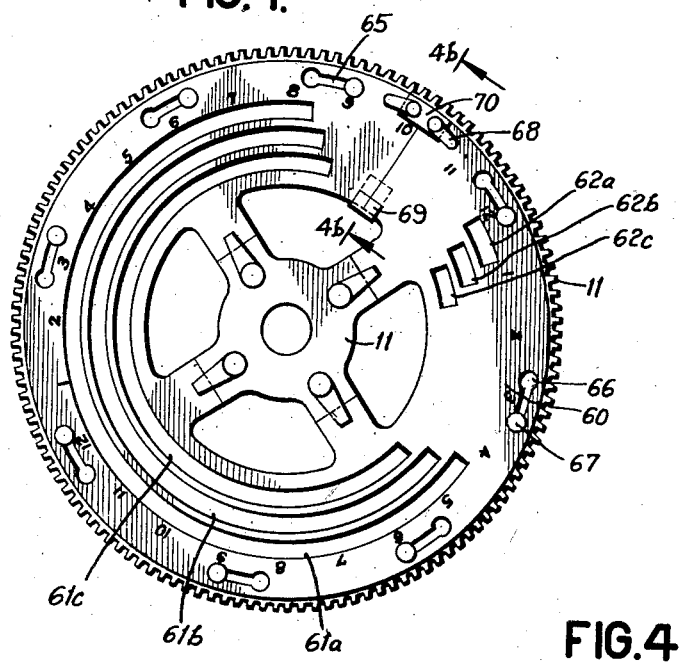
Fig. 4 is a detail view of the program disc and means of affixing the same to the program wheel.

Referring now to the drawings, a preferred embodiment of the invention is shown by way of example as applied to a time recorder of the type generally shown in U. S. Patents Nos. 935,312 and 1,684,400 to C. E. Larrabee with slight modifications hereinafter described. This type of recorder is of common knowledge in the art and consequently such parts of the description to follow which are directed exclusively to the old mechanism will be brief. Should further information as to structure details be desired, such information may be obtained by referring to the aforementioned patents.

Accordingly, in Fig. 2, the time typewheel assembly 10 is indicated diagrammatically in dotted outline and is understood to be driven from the clock train or from any customary time controlled actuating mechanism in the usual manner. Also driven by the clock train is a program disc 11 (Fig. 1). The disc 11 and its associated mechanism controls the programming of various operations of the machine in a manner which will be presently described in detail.

Ribbon color shift

As best illustrated in Fig. 2, a solenoid 20, mounted on the base 21 by a bracket 22, controls an armature 23 which has a pin and slot connection 24 with an elongated arm 25 pivoted at 26 and extending upwardly to a color flag visual indicator 27. The arrangement is such that energization of magnet 20 rotates the arm 25 clockwise about its pivot 26. During this movement a pin 30 carried by the arm 25 engages a slotted member 31 causing the latter to be shifted to the right. The slotted member 31 is provided with two shoulders 32 and 33 and is adapted to be lifted upwardly at each depression of the manual printing arm 34 through linkage 35, 36, 37, and bellcrank plate 38 which connects directly with the forked member 31 at 39. A two-colored ribbon 40 is carried on the usual spools 41 and 42 (see also Fig. 1) which are fixed to their individual shafts 43. The lower end of each shaft is provided with a flanged sleeve 44 adapted to receive lever arms 45. These lever arms 45 are fixed to a shaft 46 and it will be understood that if shaft 46 is rocked clockwise the lower portion of the ribbon becomes aligned with the typewheel assembly, whereas if the shaft 46 remains in the position shown in Fig. 2, the upper portion of the ribbon will be instrumental in effecting the imprint. In order to effect the rocking movement of shaft 46, an arm 50 is provided which is fixed to the shaft 46 and has connected thereto a link 51 extending upward and connecting with one end of a walking beam 52. The walking beam is pivoted at 53 and is provided with two studs 54, 55. Accordingly, the slotted member 31 upon its upward movement engages the stud 54, and thereby raises link 51 and arm 50 to rock the shaft 46 in a clockwise direction. Had solenoid 20 been energized, the slotted member 31 would have been shifted to the right, and the shoulder 33 would have engaged stud 55, permitting the parts to remain in the position shown. It will be appreciated, therefore, that by utilizing the customary blue and red color ribbon the color of the imprint depends upon whether solenoid 20 is energized or not. When solenoid 20 is energized the machine is arranged to print blue and when deenergized to print red. The program disc 11 and its associated mechanism controls the energization of solenoid 20 in a manner which will be explained presently.

Program device

Figure 4A:
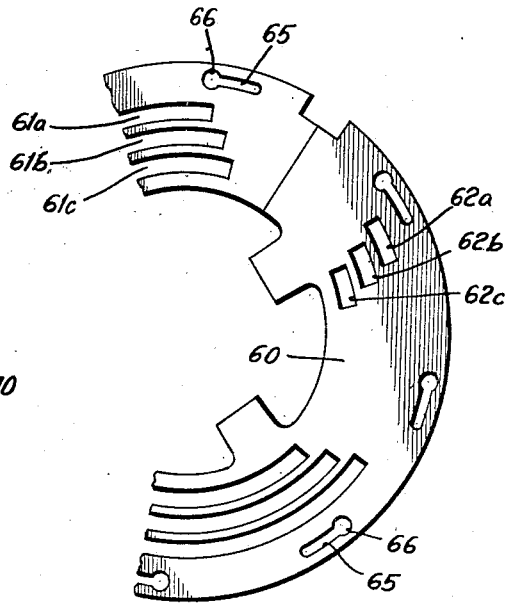
Fig. 4a is a portion of one of the program discs.
Figure 4B:
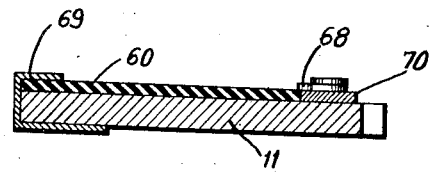
Fig. 4b is a section taken along line 4b—4b of Fig. 4.

The disc 11 is made of any suitable conducting material and is insulated from the main frame of the machine by an insulated supporting bushing 12 which is fastened to the machine by a screw 13 (Fig. 2). A conducting spring 14 (see also Fig. 1) contacts the disc 11 and is insulated from the frame by an insulating segment 15. Accordingly, a circuit may be completed from the program disc 11 through the spring 14 to an external circuit. It is understood that the screw 13 passes through the insulated bushing 12 and that the disc 11 is insulated from the main part of the machine. The driving gear 11' for disc 11 is made of any suitable non-conducting material (see Fig. 2). Insulating washers 16 are also provided to assist in preventing circuits from the disc to the machine. Affixed to the program wheel 11 is an insulating disc 60 (see also Fig. 4) which has slots such as 61a, 61b, 61c, and 62a, 62b, 62c cut therein. The disc 60 may be secured to the program wheel 11 in any suitable manner, a preferred method being to cut slots 65 (see Fig. 4a) in the disc with an enlarged round portion 66 at one end of each slot. The program wheel 11 carries pins 67 which slip easily into the round portions 66 of the slots 65 to facilitate mounting. Disc 60 is then rotated counterclockwise to a limited extent with respect to disc 11 until pins 67 engage the smaller ends of slots 65. Rotatable clamping springs 68 and clip 69 (Fig. 4b) further serve to hold the disc in place. A projection 70 on the program wheel 11 provides a mounting for the clamping springs 68 and serves to position the disc 60 as shown.

It will be understood from the foregoing that the insulating disc 60 is easily affixed to and removed from the program wheel 11. The position and length of the circular slots in the insulating disc, as will be subsequently explained, determine various time schedules. By inserting the program discs 60 with various slot relationships therein, different time schedules are provided for controlling the machine as desired.

*Program determining means*

In order to control the various operations in the machine from the program disc, an analyzing station is provided at which the slots in disc 60 are analyzed for control of the machine in a predetermined manner.

Referring to Figs. 1, 1a and 2, supporting bracket 71 carries a brush holder 72 which contains electrical sensing brushes 73, 74, 75 suitably insulated from the bracket. At certain times during the rotation of the program disc 11, circuits are completed from the program wheel 11 through the slots in the insulating disc 60 to one or more of the brushes 73—75. These circuits will be described later. The manner in which the slots 61a, 61b, 61c, and 62a, 62b, 62c are cut in the disc 60 determines the differential periods of energization of the solenoid 20 (Fig. 2). It will be noted in Figs. 1 and 4 that around the periphery of the disc 60 are a series of numbers 1, 2, 3, etc., indicating the hour of the day. The upper group of numbers 1–12 indicate a. m. and the lower group p. m. The disc rotates in a counterclockwise direction. Accordingly, a circuit may be completed through the slot 61a between 4:30 in the afternoon and 8:30 in the morning. A circuit may be completed through the slot 61b between 4:45 p. m. and 8:45 a. m. and through the slot 61c between 5:00 p. m. and 9:00 a. m. It will be recalled that energization of the solenoid 20 causes the machine to print blue. Accordingly during the periods while the respective brushes 73—75 are making contact through the slots in the disc the machine will print blue. The slots 62a, 62b, 62c, are for the noon lunch hour which is assumed by way of example to be a three-quarter hour period. Slot 62a is effective from 12:00 noon to 12:45 p. m., slot 62b from 12:15 p. m. to 1:00 p. m., and slot 62c from 12:30 p. m. to 1:15 p. m. Referring for the moment to Figs. 10 and 11, the time cards illustrated there each belong to an employee from a different department. The card in Fig. 10 is for an employee in the so-called "B" department, and the card in Fig. 11 is for a man in the so-called "C" department. All cards are provided with cut-out portions 76 in one of three positions A, B, or C to identify the department to which it is related, and upon insertion of one of these cards into the machine a certain selection is made of the circuits between the brushes 73—75 and conducting portions of the disc 11 (Fig. 1) according to whether the card is cut out in the A, B, or C portion. The manner in which this selection is effected will now be explained.

Figure 7:
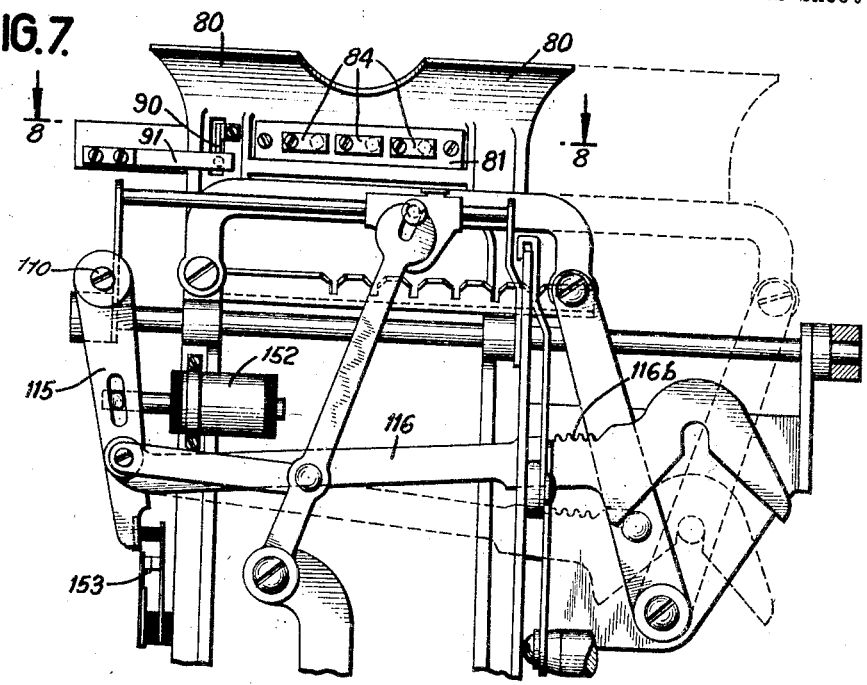
Fig. 7 is a detail front view showing different operative positions of the member which shifts the card receiver.
Figure 8:
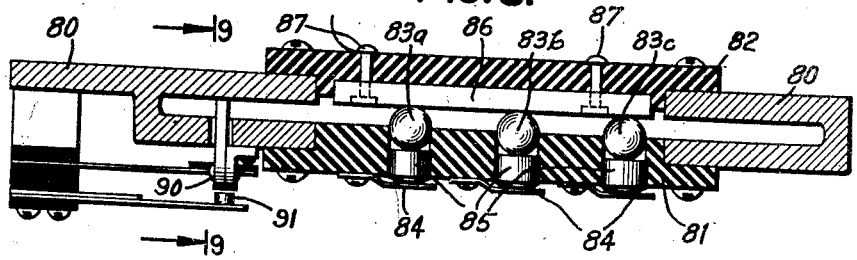
Fig. 8 is a detail view of the card lever contacts and card sensing mechanism taken substantially along the line 8—8 of Fig. 7.
Figure 9:
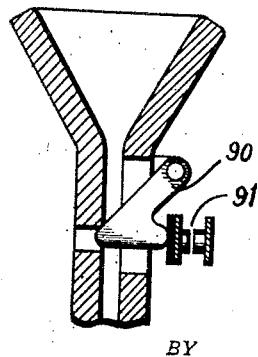
Fig. 9 is a detail side elevation of the card lever sensing mechanism taken substantially along line 9—9 of Fig. 8.

Referring to Figs. 7, 8, and 9, the upper portion of the card receiver 80 is seen to be cut so as to receive insulating plates 81 and 82. The plate 81 has holes cut therein to receive the contact sensing elements 83a, 83b, 83c. These are held in place under the bias of the contact springs 84 acting on spacers 85. The insulating portion 82 has a conducting plate 86 fastened thereto by rivets 87. Thus, as a card is inserted in the receiver 80, a contact will be made between one of the contact balls (83a, 83b or 83c), and the plate 86 through the hole 76 in the card. Thus, one contact is made during the initial stages of card insertion.

*Card lever operation*

For the purpose of initiating certain machine operations following the insertion of the record card, there is provided a set of contacts 91 which are actuated under control of the card.

Affixed to the upper part of the card receiver 80 is a card lever 90 (see Figs. 7, 8 and 9), which, upon insertion of a card into the receiver closes the card lever contacts 91. The relation between the card lever 90 and the analyzing contact balls 83a, 83b, 83c and plate 86 is such that the card lever contacts 91 close after a contact ball has entered a slot 76 in the card (see Fig. 10) but before it has left the slot. The means for energizing the ribbon shift solenoid 20 (Fig. 2) selectively will now be described with reference to the circuit diagram (Fig. 12).

In the upper part of Fig. 12, the program disc 11 is schematically shown in three circular sections. Structurally each of these segments form part of the program disc 11 but in view of the relationship of disc 60 thereto the electrical equivalent is best illustrated in the form shown in Fig. 12. Assume that the program wheel is in the position shown and let us say such position represents 8:40 a. m. A card such as that shown in Fig. 10 is inserted in the card receiver. After the edge of the card has passed under the contact balls 83a, 83b, 83c, the card lever contacts 91 close. At this time the contact ball 83b is in the registering slot 76. Accordingly, a circuit is completed from battery 88 (Fig. 12), conductor 89, card lever contacts 91 now closed, the contact plate 86, contact ball 83b, contact spacer 85 and spring 84 associated therewith, relay coil 96, then via conductor 79 to the other side of battery 88. Relay coil 96 is maintained energized through its contacts 96a and card lever contacts 91. Contacts 96b now also close and a circuit is completed from battery 88, conductor 79, wire 100, conductor 14, program disc 11, slot 61b, brush 74, now resting therein, contacts 96b (now closed), solenoid 20, wire 89, to the other side of battery 88. Energization of solenoid 20 will shift the forked member 31 (Fig. 2) as previously described and cause the machine to print blue. This is the operation desired since the program device for the cards from department B is to be effective to cause printing in blue if the employee registers before 8:45 a. m. As another example, suppose the time were 1:20 p. m. and an employee of department "C" is registering. Since department "C" has a scheduled luncheon period from 12:30 p. m. to 1:15 p. m., it is desired to have the machine register red at the time assumed in the example. Upon the insertion of the card shown in Fig. 11, a contact is made through hole 76 relating to department "C" to cause the following circuits to be established: From battery 83, card lever contacts 91, conducting plate 86, contact ball 83c, spacer 85 and spring 84 associated therewith, relay magnet 97, conductor 79, to the other side of battery 88. Magnet 97 is maintained energized through its contacts 97a. At 1:20 p. m. however, the segment 62c has passed from under the brush 74, and therefore the closure of contacts 97b does not energize the solenoid 20. Consequently the machine will print red when the actuating handle 34 is depressed.

*Card positioning mechanism*

Since certain times are allotted to each of the different departments for arrivals and departures, the column of the card in which a particular time registration is to be effected may be different depending upon the department to which the card pertains. At this point it should be mentioned that, in time recorders of the type illustrated the day-line which will be presented to the impression point depends upon the depth to which the card is inserted in the receiver, and this depends upon the position of the bottom of the receiver, known in the art as the "abutment" or "card lift," which is vertically adjustable. This abutment (not shown) is operated by suitable time-controlled mechanism, but as the same forms no part of the present invention, description thereof is deemed unnecessary, particularly as devices for the purpose are well known. Accordingly, the description will be concerned primarily with the means provided to actuate the card receiver 80 selectively in a lateral direction to insure that the proper column of the card is always in position to receive the time imprint. In Figs. 5 and 6 there is shown one form of such means, comprising three cams designated 101a, 101b, and 101c, respectively (Fig. 5). These cams are affixed to a shaft 121 and are each equivalent to the usual card shifting mechanism cam 31 disclosed in the aforementioned Patent No. 935,312. In the Larrabee patent a single cam is provided which is rotated varying amounts to control the horizontal position of the card receiver. In the instant application a plurality of such cams is provided and each cam is properly shaped to conform with the program for its related employee group. Thus cam 101a relates to department "A", cam 101b relates to department "B" and cam 101c relates to department "C". The manner of rotating these cams will now be described. The program disc 11a has an undercut circular recess or slot 109c and adjustably mounted in the slot is a series of lifters 109a each having an inclined face or edge to engage the correspondingly inclined face of a projection shown dotted on lever 109b. Hence, as the program disc 11a rotates, each lifter engaging the lug will lift the lever 109b. Connected to lever 109b is a link 109 which is raised and lowered every time it is desired to move the cams to a new position. This is effected as follows: Affixed to the shaft 121 is a ratchet 106 (see Figs. 5 and 6). Raising of link 109 pivots a plate 107 and drops a pawl 108 secured thereto in the next tooth of ratchet 106. As the link 109 is restored to normal position, the ratchet 106 is rotated one tooth position. A detent 105 cooperates with ratchet 106 to maintain the ratchet in position. Ratchet 106 is affixed to a hub 120 (see Fig. 5) which is keyed to the shaft 121. The shaft 121 is slidable in the hub 120, the latter being held in position by a forked spring piece 123 secured to the frame of the machine by a pivot 123a, the forked end straddling shaft 121. Each movement of the ratchet 106 accordingly rotates the shaft 121 and the cams 101a, 101b, 101c affixed thereto so as to position the cams for a different program of card shifting. Referring again to Fig. 6, it is seen that a follower comprising parts 125, 126, and 127 is mounted on a shaft 110. The member 125 is affixed to the shaft 110 while the member 126 is rotatably mounted thereon. Arm 126 has a leftward extension, as viewed in Fig. 6, which is normally secured by a latch 124. The shaft 110 is biased in a clockwise direction by a counter weight 110X (Fig. 5). A spring 102 connects member 125 and arm 126 in the manner shown. When magnet 122 is energized, the spring 102 under the action of arm 125 causes clockwise rotation of arm 126. Member 125 and arm 126 now operate as a single unit because of a projection 126a on arm 126 which abuts the right end of member 125. A cam follower 127 is pivotally carried by the arm 126 and has limited relative movement with respect to this arm. Lugs 128 and 129 of arm 126 restrict the movement of follower 127 so that as the assembly rotates in a clockwise direction, follower 127 engages one of the group of cams 101a, 101b, 101c and rotates in a counterclockwise direction relative to arm 126 to close the contacts 119. The shaft 110 will assume a position dependent upon which of the cams 101a, 101b, 101c was in operating relationship with the follower 127. Shaft 110 has an arm 115 secured thereto, and the shifting of this arm controls the lateral positioning of the card receiver through its connection with a locating bar 116 (see Fig. 1) os will now be explained.

The card receiver 80 (Fig. 1) is connected to a link 117 which in turn joins with a lever 118 pivoted at its lower end to a fixed plate 120. Lever 118 carries a stud 111 and it is apparent that if the locating bar 116 is moved to the right and its right end depressed, the stud 111 will cooperate with one of beveled surfaces 112 or 113 until it fits into a slot 114. It is thus seen that no matter in what position the receiver 80 may be, the locating bar 116 will, when depressed, shift the receiver and locate it in a position corresponding to the adjustment of the bar 116 which, it will be remembered was controlled by the position of shaft 110. The bar 116 is normally held in its raised position by spring 116a (Fig. 5). The card receiver may be positioned manually even if the arm 126 is latched up because of the provision of spring connection 102 between arms 125 and 126 and the fact that the arm 126 is freely mounted on the shaft 110.

Means is provided to associate a certain one of the cams 101a, 101b or 101c with the follower mechanism embodying members 125, 126, 127. Normally the cam 101a is under the follower mechanism (see Fig. 5). The shaft 121 is provided with two collars 130 and 131 free on the shaft and a stop 132 fixed to the shaft. Energization of solenoid 134 will rotate its associated bellcrank mechanism 136 about its pivot 138 which is anchored to the frame of the machine in any suitable manner. This movement is transmitted through the collar 130 to slide the shaft 121 to the left to a position where the cam 101b is aligned with the follower mechanism. Energization of solenoid 135 causes rotation of bellcrank 137 which, due to its greater mechanical movement about its pivot 139, shifts the shaft 121 to the left to align cam 101c with the follower mechanism. The movements of 136 and 137 are sufficient to close contacts 92 and 93, respectively. As will be further explained later in connection with the circuit diagram, closure of either of the last mentioned sets of contacts is instrumental in energizing the magnet 122 (Fig. 6) to release the follower mechanism for cooperation with the proper cam. This will position the card receiver actuating shaft 110 in the manner previously described.

Referring also to Fig. 5, there is shown a mechanical card shift handle 140. The purpose of this handle is to manually rotate shaft 110 for positioning the card receiver 80 at such time when out of program printing is deemed desirable. To effect a lateral shift of the card receiver manually, the knob 140 must be pushed in until a pin 143 extends between the forks of bifurcated plate 144. Through the medium of a collar 145 affixed to shaft 146, a pair of contacts 98 mounted adjacent the shaft 146 in the manner shown will be closed when handle 140 is pushed in. Closure of these contacts controls a circuit to be described later, to release the manual operating lever 34, so that printing may be effected. The structure for moving the card manually to an out of program position is shown and described fully in the previously mentioned Patent 935,312.

General operation

The complete operation of the machine with reference to the circuit diagram (Fig. 12) will now be described. It has been previously explained how the machine will be controlled to print blue or red. In the example employed in that explanation, when the card from department "B" was inserted in the receiver at 8:40 a. m., magnet 96 was energized, bringing about the energization of solenoid 20. Energization of 96 also causes energization of solenoid 134 which is connected in parallel therewith. Solenoid 134 then shifts the shaft 121 to the left, as viewed in Fig. 5, bringing cam 101b in line with the follower mechanism. Upon energization of solenoid 134 there is a closure of solenoid controlled contacts 92. Closure of contacts 92 completes a circuit from battery 88 via conductor 79, through contacts 92 through contacts 96d to energize magnet 122 through contacts 103b, conductor 89, to the other side of battery 88. Energization of magnet 122 releases follower 126 of shaft 110, permitting the follower element 127 to engage the selected program cam 101a, b, or c. The rocking of shaft 110 serves to select the lateral location of card receiver 80 and element 127 closes contacts 119 (Fig. 6), as previously explained. Closure of contacts 119 energizes magnet 142 which then attracts its armature 143 (Figs. 2 and 3) pulling the upper extension 144 of the armature from under the operating handle 34b. Handle 34b is normally depressible manually but while extension 144 is beneath the arm 34, it forms a latch to prevent depression of the operating handle 34b. With the latch removed, the hammer arm 34 is now depressed which also closes contacts 150 (Fig. 2) through the movement imparted to link 36. Closure of contacts 150 energizes relay 151 and solenoid 152 in parallel therewith. Relay 151 and solenoid 152 are maintained energized by a circuit through contacts 153 and relay contacts 151a (see also Fig. 7). Contacts 153 are mounted on the frame of the machine in such a manner that they extend into the path of lever 115 (Fig. 1). The contacts 153 are opened only as the lever 115 approaches its extreme rightward position. Contacts 151a are closed upon energization of relay magnet 151. Energization of 152 is ineffective at this time insofar as the control of bar 116 is concerned, because this bar is held in position by notches 116b (Fig. 7). These notches cooperate with a vertical plate 56, pivoted to the frame, which is drawn down on the notches upon depression of the manual operating lever 34 by reason of a link 57 which connects plate 56 with lever 34. The depression of the operating handle 34 first brings plate 56 into a notch 116b and then moves the plate 56 further down to depress the locating bar 116. Depression of bar 116, in the manner previously explained, shifts the card receiver 80 to the selected lateral position with respect to the time typewheel assembly 10. During its downward stroke, handle 34, through known device 3, retracts hammer 2. As the handle completes its downward stroke, device 3 acts in the usual manner to release hammer 2 for a printing stroke. The hammer thereupon effects an imprint of the time from the type wheels 10, through the selected half of ribbon 40, in the selected lateral field of the card. In the example where the card pertains to department B and the employee is registering at 8:40 a. m., the blue half of the ribbon is in printing position and the registration will be blue in the first or "morning in" column of the card. Contacts 151b are closed by the energization of relay 151 to energize relay 103 which is then held through relay holding contacts 103a and card lever contacts 91. Contacts 103b now open to deenergize magnet 122, thereby restoring the armature latch 124 to its normal position as shown in Fig 6. When the operating handle 34 is released, the solenoid 152 becomes effective to rotate the arm 115 (Fig. 7) as far to the right as it will go. This also brings about the opening of the contacts 153 to cause deenergization of the solenoid 152. Due to a slight overthrow action of the solenoid 152, the latch 124 will have positioned and held the follower 126 before the solenoid 152 is deenergized. If the card is being manually positioned, the contacts 98 (Fig. 5) will close in the manner previously described to energize magnet 142 and thereby release the operating handle 34 for manual movement. It is understood that before the machine is to be used the ratchet magnet 122 and its latch will have been set so that the follower mechanism is in the position shown.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a time recorder in which means are provided to print time records on record sheets insertable one at a time in printing position and in which means are provided to selectively classify the time records, the combination of classification control means for controlling operation of the classifying means, time controlled program determining means including a disk having a plurality of circumferentially extending exposed portions of differential circumferential extents representing different but overlapping programs of time periods and means coacting with the portions, with each exposed portion and coacting means comprises a program determining device capable of program-control of the effectivity of the classification control means, and means to render the program devices selectively effective to control the effectivity of the classification control means so as to control, in turn, operation of the classifying means for the time records.

2. In a time recorder as defined in claim 1, in which the record sheets have different control characteristics, the further limitation that the means to render the program devices selectively effective are controlled by the control characteristic of a record sheet inserted in printing position so as to render effective only the program device denoted by the characteristic of the inserted record sheet.

3. In a time recorder as defined in claim 1, the further limitation that means are provided to prevent operation of the printing means until after the program devices have been selectively rendered effective and the effectivity of the classification control means has been determined by the selected program device.

4. In a time recorder in which means are provided to print time records through a multicolor ribbon on record sheets insertable one at a time in printing position, the combination of classification control means for determining through which color portion of the ribbon the time record is to be made, a plurality of time controlled program devices each individually capable of controlling the effectivity of the classification control means according to one of a plurality of different program periods, each such period being determined by one of the program devices, and means to select any one of the program devices for exclusive control of effectivity of the classification control means.

5. The time recorder as defined in claim 4, the said means to select a program device being under control of a differentiating characteristic of a record sheet inserted in printing position, said sheets having different differentiating characteristics so that the latter means will select one or another of the program devices according to whether the inserted record sheet has one or another characteristic.

6. In a time recorder including a card holder, printing devices and operating means therefor for effecting printing of time records on a record card inserted in said holder, each such record card having one or another control designation, the combination of means for shifting the card holder relatively to the printing devices, a plurality of time controlled program devices each capable of controlling the shifting means according to a different program of time periods, analyzing means for analyzing an inserted record card for its control designation, means controlled by the analyzing means to associate the card holder shifting means with one of the program devices for operation thereby prior to the operation of the time printing devices so as to cause the inserted record card to receive a time record in a predetermined location thereof dependent upon the time period during which said printing devices are operated.

7. In a time recorder having time printing elements for printing time records on a record sheet, and a holder for holding the sheet in printing relation with said elements; the combination of record sheet holder shifting means for moving the holder and the inserted sheet relative to the printing elements, a plurality of individually operable program control devices to control the sheet shifting means, means controlled by the sheet upon its insertion into the receiver to associate the card shifting means with one of the program devices for control thereby to shift the sheet support and the inserted sheet in accordance with a predetermined program of time periods as determined by the program control device associated with the card shifting means so as to position the sheet to receive a time record in a predetermined different location thereof for each time period, and means to prevent operation of the printing elements to effect such a time record until after the sheet is properly positioned.

8. In a time recorder including a card support for a record card, and time printing devices for printing time records on the record card while it is carried by the support; the combination of a plurality of program elements for determining the positioning of the support relatively to the time printing devices to provide the in-and-out spacing of the time records, each of said elements being capable of determining positioning of the support according to a different program of time periods, and means rendered effective under control of the card prior to the operation of the time printing devices for selecting one of said elements to position said support in accordance with the program element so selected.

9. In a time recorder, a card holder for a record card insertable therein, and time printing devices for printing time records on the inserted record card; the combination of a plurality of individually operable control cams for determining movement of the holder with respect to the time printing devices to provide in-and-out spacing of the time records, each of said cams capable of determining movement of the holder according to a different program of time periods, and analyzing means for analyzing the record card for a control designation thereon, means controlled by the analyzing means upon analysis of said designation to select one of the cams for positioning of the card according to the selected program.

10. In a time recorder including a card holder for a record card insertable therein, and time printing devices for printing time records on the inserted record card; the combination of a plurality of program members for controlling location of the holder with respect to the printing devices to provide for in-and-out spacing of the time records, time controlled means comprising a program wheel having set up means for controlling setting of the program members, and means controlled in accordance with the location of a cut-away portion of the card for determining which of the said different program members is to be effective to control the position of the card holder prior to the printing of a time record by the card.

11. In a time recorder in which time cards pertaining to different work schedules are insertable one at a time to receive a time value record from a set of time value type wheels, the combination of means common to all the schedules for affording selective classification of any such time value record made by the set of type wheels on a time card, a plurality of time controlled schedule determining devices for controlling the first-mentioned means in accordance with the different work schedules, each such device determining a different one of the work schedules and each capable of controlling the first-mentioned means in accordance with the schedule determined thereby, and means to enable one or another of the said devices to be effective to control the first-mentioned means so as to afford selective classification of the time value record, made by the set of type wheel on an inserted time card, in accordance with the schedule determined by the enabled device.

12. In a time recorder in which time cards pertaining to different schedules are insertable one at a time to receive a time value record from a set of type wheels, the combination of means common to all said schedules for affording selective classification of any such time record made by said set of type wheels on a time card, a plurality of time controlled schedule determining devices, each determining a different work schedule and each capable of controlling the first-mentioned means in accordance with the schedule determined thereby, and means controlled by an inserted time card in accordance with a schedule denoting characteristic thereof for enabling one of the schedule determining devices to be exclusively effective to control said first-mentioned means so as to afford a selective classification of the time value record made on the inserted time card by the said set of type wheels, with such classification being determined by the enabled schedule determining device.

13. In a time recorder as set forth in claim 12, in which the time cards have different schedule selecting characteristics, the further limitation that the stated means controlled in accordance with a schedule selecting characteristic comprises a plurality of individual sensing devices, each for sensing a different one of the said characteristics and further comprises elements under selective control of the sensing devices for selectively enabling the said schedule devices.

14. In a time recorder in which time cards are insertable one at a time to receive a time value record from a set of type wheels, the combination of a plurality of time controlled schedule devices, each determining a different work schedule, means common to all said schedule devices and capable of being controlled by any one of them for affording selective classification of a time value record made by said set of type wheels, and means controlled by a schedule selecting characteristic of an inserted time card for enabling one of said schedule devices to be exclusively effective to control the first-mentioned means for affording a classification of the time record made on the inserted time card by said set of type wheels, with such classification being determined by the enabled schedule device.

15. In a time recorder in which time cards are insertable one at a time to receive a horological time record from a set of time operated type wheels advanced in accordance with horological time, the combination of a plurality of time controlled schedule devices, each determining a different work schedule, means common to all said schedule devices and capable of being controlled by any one of them for affording selective classification of a horological time record made by said set of type wheels, and means controlled by a characteristic of an inserted time card for enabling one of said schedule devices to be exclusively effective to control the first-mentioned means for affording a classification of the horological time record made on the inserted card by said set of type wheels, with such classification being determined by the enabled schedule device.

16. In a time recorder as defined in claim 12, said classification affording means affording the selective classification by causing the time value record to be printed in one color or another and including means for determining different locations of a multi-color ribbon during the recording operations.

17. In a time recorder as defined in claim 12, said classification affording means affording the selective classification by causing the time value record to be made in one or another of a plurality of separate fields of the inserted time card and including means for determining selective location of such fields in recording position.

18. In a time recorder, time-controlled recording elements to record time records on cards bearing schedule selecting designations and insertable one at a time, a plurality of time-controlled scheduling devices, means controlled selectively by said devices for effecting selective classification of the time records, and means controlled by a schedule selecting designation of the inserted card for selecting one of said scheduling devices to act through the first-named means to effect selective classification of the time record made on the inserted card.

19. In a time recorder, time-controlled recording elements to record time records in different fields of cards bearing schedule selecting designations and insertable one at a time, a plurality of time-controlled scheduling devices, means controlled selectively thereby for determining in which field of an inserted card the record is to be made, and means controlled by a schedule selecting designation of the inserted card for selecting one of the scheduling devices to act through the first-named means for selecting the field of the inserted card in which the record is to be made.

ROBERT T. BLAKELY.